March 4, 1952   R. MERKL   2,587,748
RODENT TRAP
Filed Sept. 9, 1946
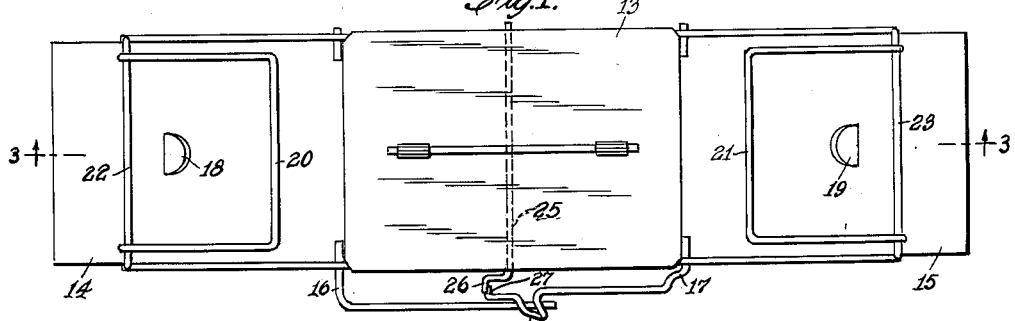
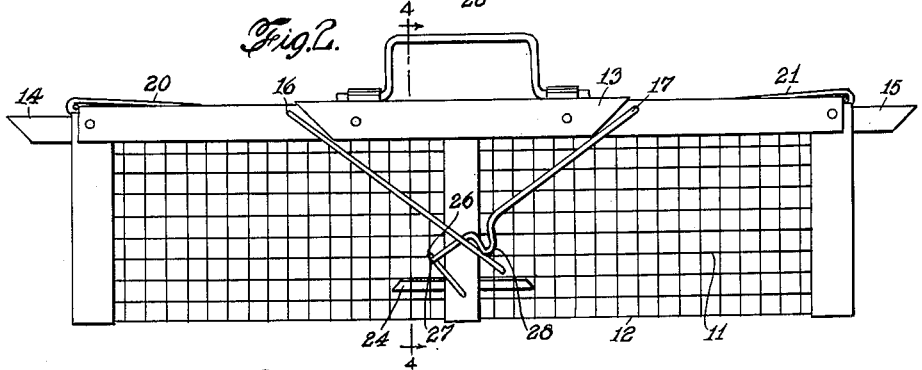
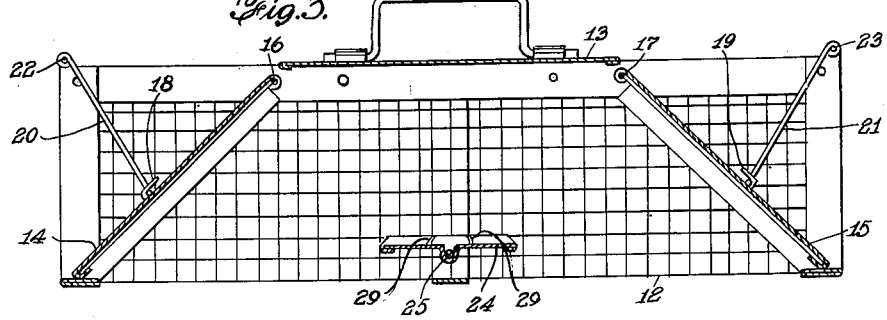
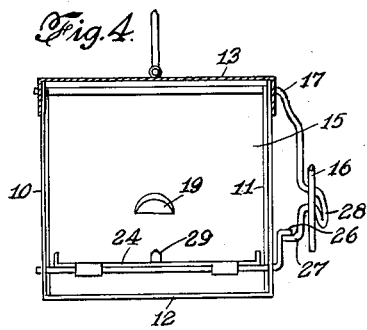
INVENTOR.
RUPERT MERKL
BY
ATTORNEY.

Patented Mar. 4, 1952

2,587,748

UNITED STATES PATENT OFFICE 2,587,748

RODENT TRAP

Rupert Merkl, Ossining, N. Y.

Application September 9, 1946, Serial No. 695,782
In Canada June 6, 1946

1 Claim. (Cl. 43—61)

This invention relates to improvements in traps, particularly to an animal trap for catching large and small animals, such as mice, rats, squirrels, and like animals, and the object of my invention is to provide a trap, the end doors of which are kept open when the trap is set and are closed by operation of a trap springing mechanism by the animal, through the use of a platform when trying to remove the bait therefrom.

Another purpose of my invention is to provide a trap of simple, inexpensive and durable construction, yet efficient in operation.

A further object of my invention is the provision of a trap of this type, the doors of which are equipped with means for keeping the same closed when the trap has been sprung by an animal caught therein.

A still further object of my invention is the provision of an animal trap equipped with a suitable lever mechanism including a trigger adapted to normally keep the platform carrying the bait raised and the door open.

These and other objects and advantages of my invention will become more fully apparent as the description proceeds and will be more specifically defined in the appended claim.

The invention may be clearly understood by reference to the following detailed description when taken in connection with the accompanying drawings, in which:

Fig. 1 is a plan view of a trap constructed according to my invention.

Fig. 2 is a side elevation of the trap shown in the preceding view.

Fig. 3 is a central longitudinal section through the trap and showing the same in the sprung position on line 3—3 of Figure 1.

Fig. 4 is a cross section on line 4—4 of Figure 2.

As shown the trap consists of a wire casing composed of two parallel side walls 10, 11 and a bottom wall 12 all composed of wire of ½" mesh, a top plate 13, and movable end walls 14 and 15.

The inner ends of the end walls or doors are hingedly connected to cross rods 16 and 17 and carry at the center of their outer faces punched up strips 18 and 19 for engagement by bails 20, 21 to secure the movable end walls 14, 15 from displacement after the trap has been sprung as shown in Fig. 3, these bails being pivotally secured on cross rods 22, 23.

To reach the bait, the animal must step on a platform 24 which is pivoted on a cross rod 25 one of whose ends is shaped as shown in Fig. 1 in order to provide a latch member 26 which in set position holds down a second latch member 27 formed integrally with the cross rod 17 which also has an offset part 28 which may be bent downwardly forming a hook to retain an extension of the cross rod 16 to secure the end walls 14 in raised position as the offset or detent 28 does by engagement with said extension of the cross rod 16.

The operation of my trap will be evident from the disclosure and it is to be understood that after the trap is sprung the bails 20—21 will prevent the escape of a traped animal due to their position as shown in Fig. 3 in which said bails assume a locking position with respect to the end walls 14—15.

When setting the trap, the bait is placed between two ears 29 punched up from the platform 24, the extension of cross rod 17 is depressed carrying with it an angular extension of the cross rod 16, the latch member 26 is engaged by the latch member 27 as shown in Fig. 2 to keep the platform in horizontal position with the end walls raised.

If now the animal in order to reach the bait steps on the platform 24, its weight will tilt same and disengage latch 26 from the latch member 27, so that the doors under their own weight will close, and be kept closed by the engagement of the bails 20, 21 by the stops 18, 19 to prevent the escape of the animal.

It will be understood that certain changes in the construction and arrangements may be made in the combination of the trap as come within the scope of the appended claim without departure from my invention.

Having thus described my invention what I claim as new and desire to secure by Letters Patent is:

A rodent trap comprising a casing having side walls and a top, said top comprising two doors individually pivotally secured to said casing, two lever members positioned outside of said casing and generally in planes substantially parallel to said side walls, one of said lever members being rigidly connected with one of said doors and the other lever member being rigidly connected with the other door, one of said lever members having a laterally extending detent engaging the other lever member when said doors are in open position and holding said other lever member in the position in which the door connected therewith is open, latch means engageable with the lever member having said portion and holding it in the position in which the door connected therewith is open, and means positioned within the casing and connected with said latch means for actuating the latter to release the lever member having said portion and affording closing of said doors.

RUPERT MERKL.

REFERENCES CITED

The following references are of record in the file of this patent:

UNITED STATES PATENTS

| Number | Name | Date |
|---|---|---|
| 383,972 | Mittler | June 5, 1888 |
| 1,444,934 | Miller | Feb. 13, 1923 |
| 1,453,796 | Hovell | May 1, 1923 |
| 1,784,904 | Merkl | Dec. 16, 1930 |
| 1,877,712 | Zelma | Sept. 13, 1932 |